April 14, 1964 H. W. SCHMITZ 3,128,594
HYDRAULICALLY OPERATED WINDSHIELD WIPER ACTUATING MECHANISM
Filed Jan. 10, 1961 6 Sheets-Sheet 5
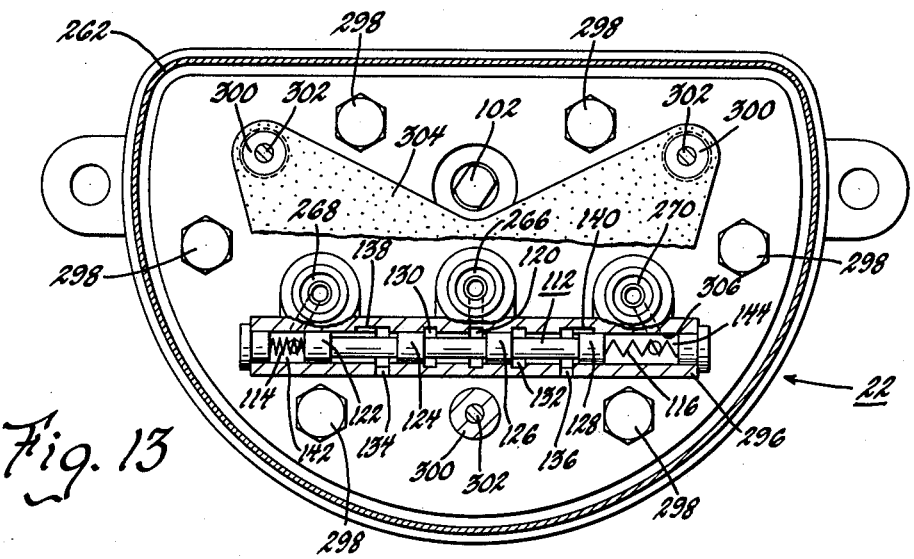
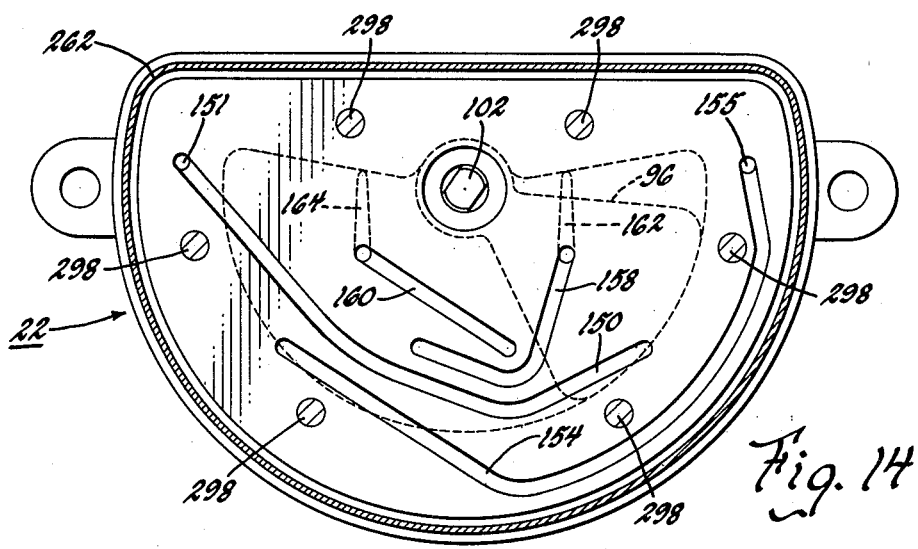
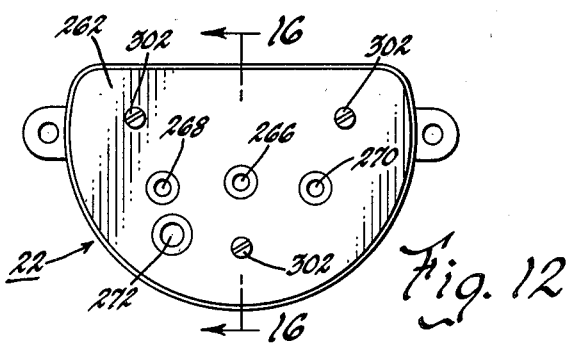
INVENTOR.
Harry W. Schmitz
BY
W. E. Finken
HIS ATTORNEY April 14, 1964     H. W. SCHMITZ     3,128,594
HYDRAULICALLY OPERATED WINDSHIELD WIPER ACTUATING MECHANISM
Filed Jan. 10, 1961     6 Sheets-Sheet 6

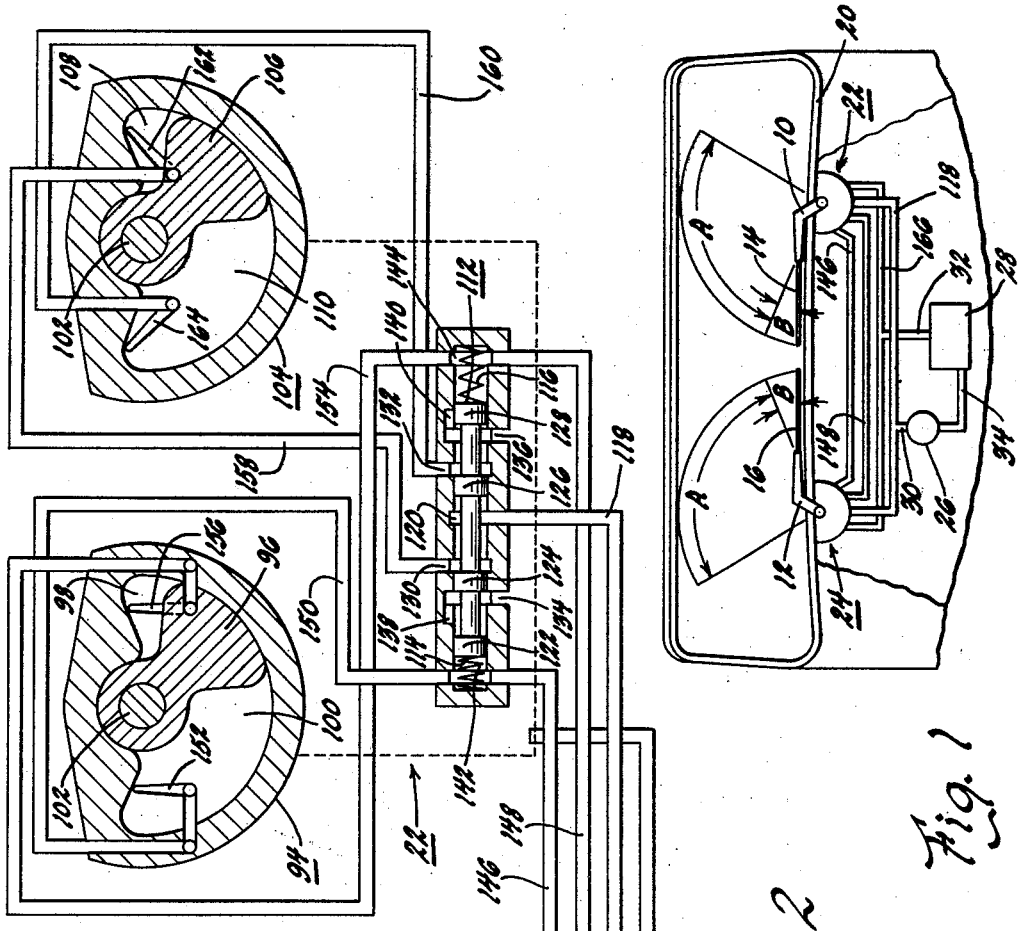

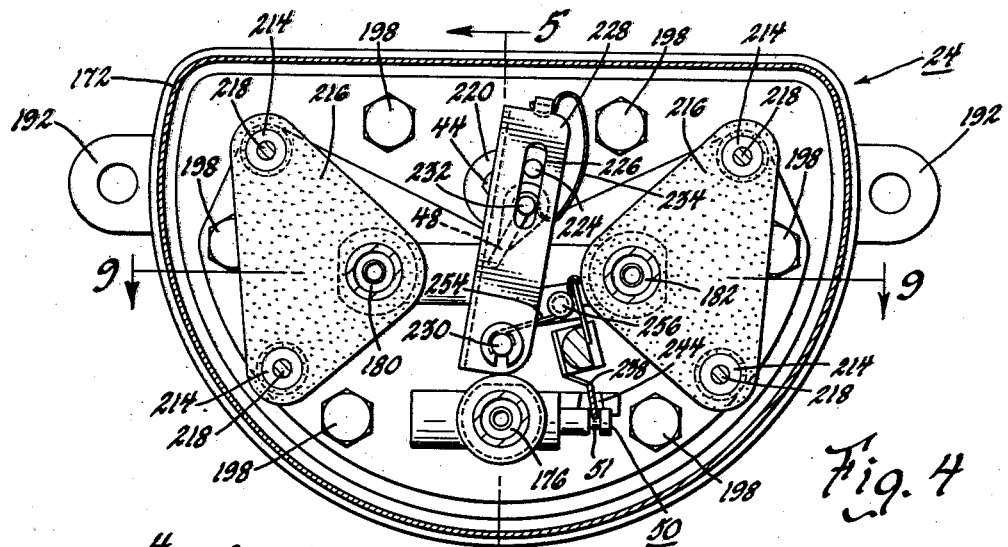

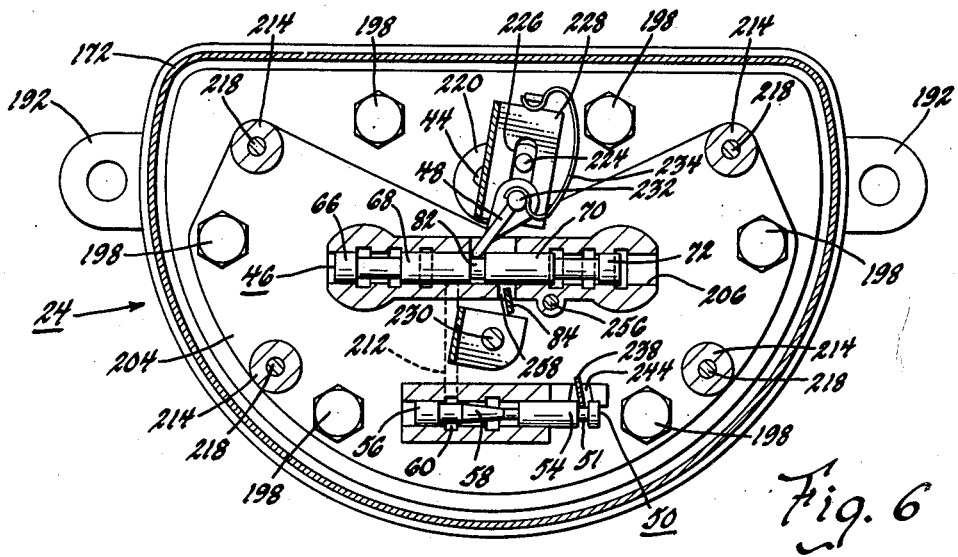

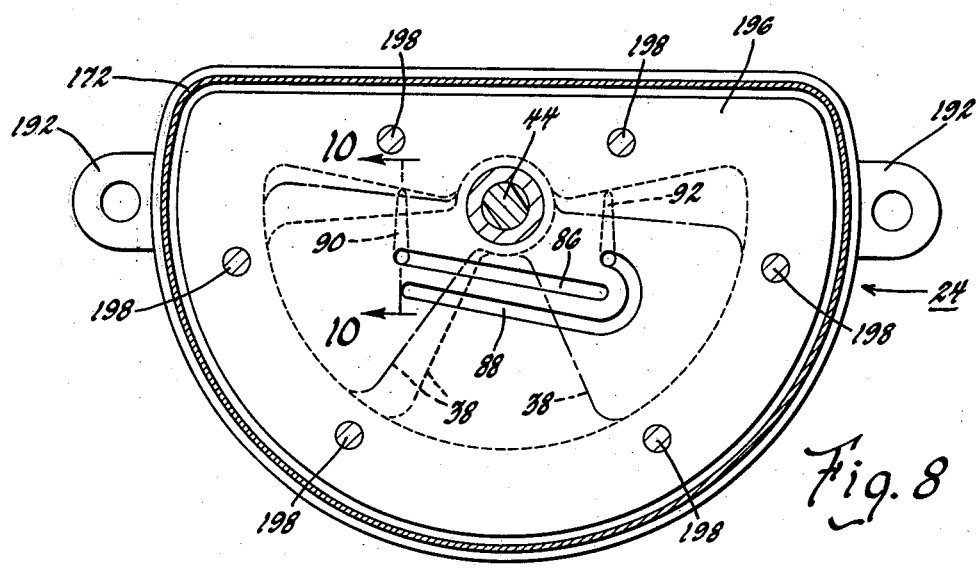
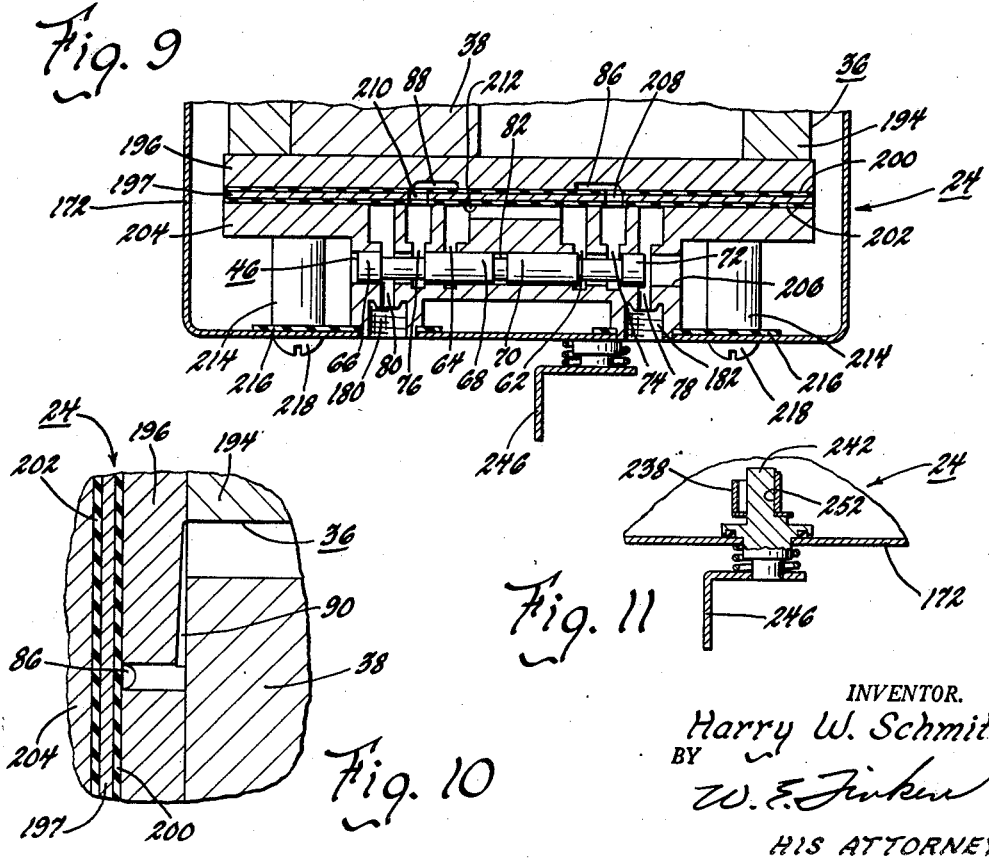

INVENTOR.
Harry W. Schmitz
BY
W. E. Finken
HIS ATTORNEY

United States Patent Office 3,128,594
Patented Apr. 14, 1964

3,128,594
HYDRAULICALLY OPERATED WINDSHIELD
WIPER ACTUATING MECHANISM
Harry W. Schmitz, Camillus, N.Y., assignor to General
Motors Corporation, Detroit, Mich., a corporation of
Delaware
Filed Jan. 10, 1961, Ser. No. 81,769
19 Claims. (Cl. 60—10.5)

This invention pertains to windshield wiper mechanisms, and particularly to an improved hydraulically operated windshield wiper actuating mechanism and the motors therefor.

At the present time most motor vehicles are equipped with windshield wiper actuating mechanisms comprising a single motor operatively connected through transmission means to a pair of spaced pivot shafts for oscillating a pair of wiper blades across the outer surface of the windshield. Irrespective of whether the wiper motor is of the electric or fluid pressure differential operated type, the transmission means between the motor and the spaced pivot shafts require considerable space and add considerably to the expense of the mechanism. The present invention relates to hydraulically operated wiper means wherein each pivot shaft is driven by its own hydraulic motor, and wherein movements of the motors are hydraulically synchronized under normal load conditions. Accordingly, among my objects are the provision of an improved hydraulically operated windshield wiper actuating mechanism including a motor for driving each wiper blade; the further provision of a hydraulically operated wiper actuating mechanism including means for hydraulically synchronizing the movements of a pair of hydraulic motors under normal load conditions; the still further provision of an improved hydraulic wiper motor of the oscillatory type; and the still further provision of a hydraulic motor assembly designed for synchronous operation with another hydraulic motor assembly located remotely therefrom under normal load conditions.

The aforementioned and other objects are accomplished in the present invention by embodying a synchronizer vane in a slave motor assembly and connecting the synchronizer vane hydraulically with a master motor assembly. Specifically, the improved hydraulically operated mechanism comprises a master motor assembly and a slave motor assembly. Both motor assemblies include arcuate cylinders having vane pistons disposed therein dividing their respective cylinders into a pair of opposed chambers which, which subjected to a pressure differential, will impart oscillation to the vanes. The master motor vane is operative connected through an overcenter toggle mechanism to a reversing valve for controlling the alternate connections of the opposed master motor chambers to pressure and drain so as to maintain the master vane in continuous oscillation throughout a predetermined stroke during running operation. In addition, the master motor includes means for latching the reversing valve in one position so as to preclude operation thereof by the toggle mechanism whereby the stroke of the master motor vane can be extended beyond its normal running limit to a parked position whereat its movement will be automatically arrested. In this matter, the wiper blade oscillated by the master motor is movable throughout a running stroke of predetermined angular extent and to a depressed parked position beyond one end of its running stroke.

The slave hydraulic motor assembly comprises a pair of oscillatable vanes disposed in independent cylinders, each vane dividing its cylinder into a pair of opposed chambers. A synchronizer vane piston its disposed within one of the cylinders and a driver vane is disposed within the other cylinder. Opposed chambers of the synchronizer cylinder are hydraulically connected through the reversing valve of the master motor with opposed chambers of the master motor cylinder whereby drain from the master motor cylinder is supplied to alternate chambers of the synchronizer motor cylinder.

The drain flow from the master motor cylinder also actuates a servo reversing valve for the driver vane of the slave motor assembly. The servo valve is normally spring centered, and responds to drain pressure from the master motor to control and regulate the pressure differential applied to the slave driver vane in response to the load thereon so as to maintain the slave driver vane in synchronism with the master motor vane. In addition, the servo reversing valve for the slave motor assembly includes means for connecting the master cylinder chambers directly to drain thus bypassing the synchronizer cylinder in the event the slave motor assembly is restrained against movement due to an overload.

Further objects and advantages of the present invention will be apparent from the following description, reference being had to the accompanying drawings, wherein a preferred embodiment of the present invention is clearly shown, and wherein similar numerals depict similar parts throughout the several views.

In the drawings:

FIGURE 1 is a fragmentary schematic view of a vehicle equipped with the windshield wiper mechanism of this invention.

FIGURE 2 is a schematic view of the improved hydraulically operated windshield wiper mechanism of this invention.

FIGURE 3 is a view in elevation of the master motor assembly.

FIGURE 4 is an enlarged view, partly in section and partly in elevation, taken along line 4—4 of FIGURE 5 of the master motor assembly.

FIGURE 5 is a sectional view taken along line 5—5 of FIGURE 4.

FIGURES 6, 7 and 8 are, respectively, sectional views taken along lines 6—6, 7—7 and 8—8 of FIGURE 5.

FIGURE 9 is a fragmentary, sectional view taken along line 9—9 of FIGURE 4.

FIGURE 10 is a fragmentary, sectional view taken along line 10—10 of FIGURE 8.

FIGURE 11 is a fragmentary, sectional view taken along line 11—11 of FIGURE 3.

FIGURE 12 is a view in elevation of the slave motor assembly.

Figure 15:
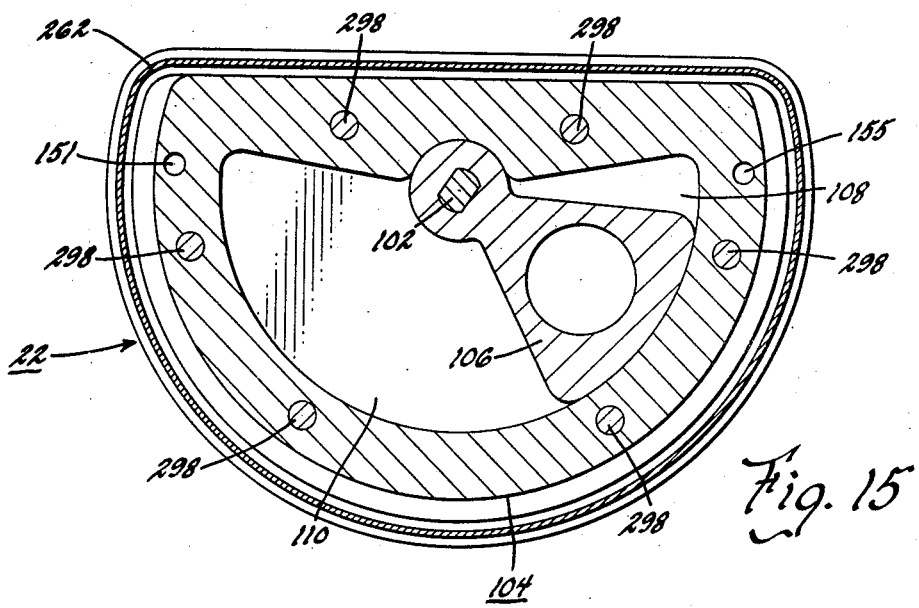
Figure 16:
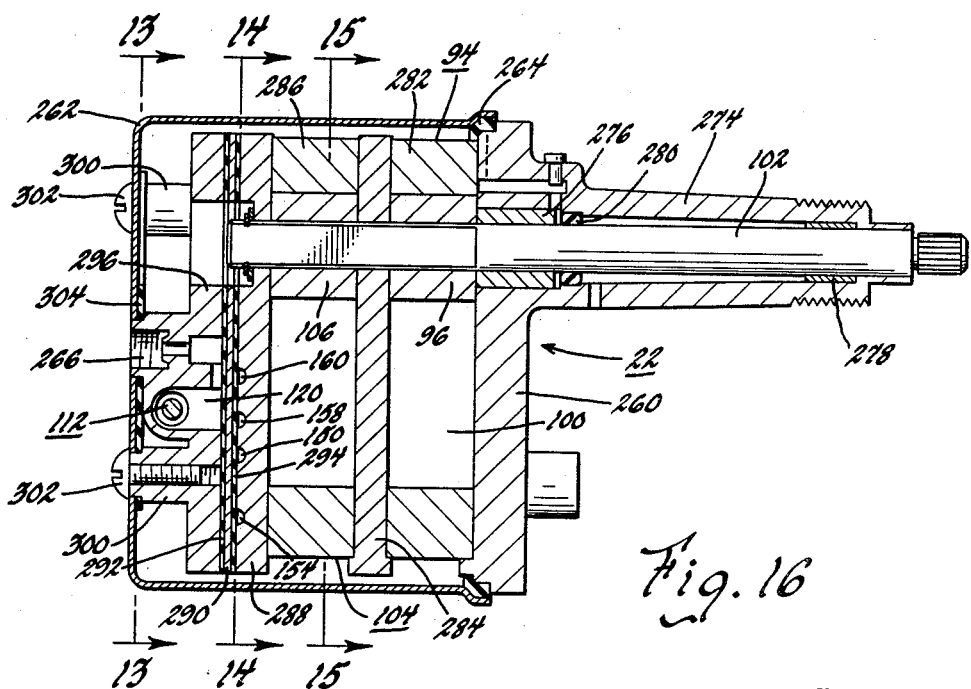

FIGURES 13, 14 and 15 are, respectively, enlarged sectional views of the slave motor assembly taken along lines 13—13, 14—14 and 15—15, respectively, of FIGURE 16.

FIGURE 16 is an enlarged, sectional view of the slave motor assembly taken along line 16—16 of FIGURE 12.

With particular reference of FIGURE 1, a typical windshield wiper installation for a motor vehicle is shown comprising a pair of conventional wiper arms 10 and 12 carrying wiper blades 14 and 16, respectively, which are oscillatable across the surface of a windshield in phase opposition. The wiper blades 14 and 16 are oscillatable throughout running strokes A between inboard and outboard stroke end limits, and to depressed parked position beyond the inboard stroke end limits through an angle B whereat they engage the lower reveal molding 20 of the windshield. The wiper arms 10 and 12 are driven by hydraulic motors 22 and 24 which are operated by hydraulic fluid under pressure supplied by a pump 26 from a reservoir 28 as will be described in particular hereinafter.

With reference to FIGURE 2, the improved hydraulically operated wiper mechanism is shown schematically wherein the motor 24 constitutes a master motor and the motor 22 constitutes a slave motor. The pump 26 delivers hydraulic fluid under pressure to conduit 30, and the reservoir 28 is connected to drain conduit 32, the inlet of the pump 26 being connected to the reservoir by conduit 34 as seen in FIGURE 1. The master motor 24 comprises an arcuate cylinder 36 having an oscillatable, or reciprocable, vane piston 38 disposed therein and dividing the cylinder 36 into opposed chambers 40 and 42. The vane 38 is drivingly connected to a pivot shaft 44 to which the wiper arm 12 is attached. The master motor 24 also includes a reversing valve 46 actuated by a snap-acting toggle lever 48, and a manually operable control valve 50.

The pump delivery conduit 30 is connected to an inlet port 52 of the control valve 50, the control valve 50 comprising a plunger having sealing lands 54 and 56 and a frusto conical throttling surface 58 for controlling communication between the inlet port 52 and the outlet port 60. The control valve 50 is movable between "park" and "high speed" positions indicated in FIGURE 2. The outlet port 60 of the control valve 50 is connected to a pair of pressure supply ports 62 and 64 of the reversing valve 46. The reversing valve 46 includes a reciprocable plunger having spaced sealing lands 66, 68, 70 and 72. The reversing valve 46 also includes control ports 74 and 76 and synchronizer drain ports 78 and 80. The pivotally movable toggle lever 48 has an end portion disposed in an annular groove 82 between sealing lands 68 and 70.

A parking latch 84, which will be described in detail hereinafter, can be engaged with the groove 82 so as to preclude movement of the reversing valve 46 by the toggle lever 48 and cause the motors to move the wiper blades to depressed parked positions as shown in FIGURE 1.

The control ports 74 and 76 are connected by passages 86 and 88, respectively, to opposed chambers 40 and 42 of the master motor cylinder through tapered ports 90 and 92, respectively. The tapered ports 90 and 92 are formed in a face of the cylinder and are alternately gradually closed by the vane piston 38 adjacent the running stroke ends thereof so as to decelerate the movement and reduce the abruptness of movement reversal of the vane piston.

The slave motor assembly 22 comprises an arcuate synchronizer cylinder 94 having a vane piston 96 therein dividing its cylinder into opposed chambers 98 and 100. The synchronizer vane piston is drivingly connected to a pivot shaft 102. The slave motor assembly also includes a driver cylinder 104 having a vane piston 106 therein dividing its cylinder into opposed chambers 108 and 110. The driver vane 106 is likewise connected to the pivot shaft 102 to which the wiper arm 10 is attached. In addition, the slave motor assembly 22 includes a reversing valve 112 which is normally centered by opposed springs 114 and 116 and is servo actuated to off-center positions in a manner to be described.

The pressure supply conduit 30 communicates with a conduit 118 connected to a pressure inlet port 120 of the reversing valve 112. The reversing valve 112 includes spaced sealing lands 122, 124, 126 and 128, the end surfaces of the lands 122 and 128 also constituting piston means. In addition, the reversing valve 112 includes control ports 130 and 132, drain ports 134 and 136, overload drain grooves 138 and 140 and servo chambers 142 and 144. A conduit 146 connects the servo means 142 with the drain port 80 of the reversing valve of the master motor assembly 24, and a conduit 148 connects the servo chamber 144 with the drain port 78 of the master motor assembly 24. In addition, the servo chamber 142 is connected by a passage 150 to slave motor chamber 100 through a tapered port 152, and the servo chamber 144 is connected by passage 154 to the slave motor chamber 98 through a tapered port 156. The control ports 130 and 132 of the reversing valve 112 are connected by passages 158 and 160 to opposed chambers 108 and 110, respectively, of the drive cylinder through tapered ports 162 and 164, respectively.

The control valve 50 is shown in a low speed "on" position in FIGURE 2 wherein hydraulic fluid under pressure from the conduit 30 is throttled by the surface 58 and supplied through outlet port 60 to the supply ports 62 and 64 of the reversing valve 46. At the same time, hydraulic fluid under pump pressure is supplied through conduits 30 and 118 to the supply port 120 of the reversing valve 112. With the reversing valve 46 in the position shown in FIGURE 2, hydraulic fluid under pressure is supplied through ports 64 and 76 to passage 88 and port 90 to the master motor chamber 40. The master motor chamber 42 is connected through port 92 and passage 86, ports 74 and 78, to conduit 148 and the servo chamber 144, and thence through passage 154 to the synchronizer chamber 98 through port 156. Accordingly, as the master motor vane 38 moves in the counterclockwise direction as viewed in FIGURE 2 due to the pressure differential between chambers 40 and 42, hydraulic fluid from chamber 42 will be forced through port 92 and passage 86 through ports 74, 78 and passage 148 to the servo chamber 144. This hydraulic fluid under pressure will move the reversing valve 112 to the position shown, and since the fluid is displaced from the master motor chamber 42 which has the same volume as the synchronizer motor cylinder chamber, the synchronizer vane 96 will tend to move in synchronism in the clockwise direction with the master vane 38. At the same time, the reversing valve 112 will supply hydraulic fluid under pressure from the conduit 118 and port 120 through port 130 and passage 158 to the driver chamber 108 through port 162. The chamber 110 is connected to drain through port 164 and passage 160, ports 132 and 136 and conduit 166. The driver vane 106 of the slave motor assembly will move in synchronism with the synchronizer vane 96 since they are mechanically connected to the same shaft 102, and likewise move in synchronism with the master vane 38 under normal load conditions. This is true since if the load imposed on the shaft 102 should be greater or less than the load imposed on the shaft 44, the reversing valve 112 will be positioned so that the requisite pressure differential will be applied between opposed chambers of the driver cylinder. The driver vane cannot lag behind the movement of the master vane since the hydraulic fluid displaced from the master cylinder is supplied directly to the synchronizer cylinder, which cylinders are of equal value. Likewise, if the synchronizer and driver vanes of the slave motor assembly should tend to lead movement of the master vane, a void would be created in the synchronizer cylinder thereby dissipating the drain pressure and enabling the centering springs 114 and 116 to reposition the reversing valve 112 so as to interrupt the application of fluid under pressure to the driver cylinder of the slave motor assembly.

In instances where the slave motor assembly is restrained against movement, such as caused by freezing of the wiper blade 114 to the windshield, the reversing valve 112 will be moved beyond the normal control position under the urge of hydraulic pressure in either servo chamber 142 or 114 so as to connect either passage 146 or 148 directly to drain through grooves 138 or 140, respectively. This arrangement constitutes a safety feature preventing damage to the slave motor blade in the event the slave motor assembly is restrained against all movement and a double driving load imposed by vanes 96 and 106. This also serves to orient the master and slave blades at the ends of their respective strokes through the load changes imposed by the restrictive ports.

As the master vane 38 approaches its stroke end in the counterclockwise direction, it will actuate the toggle lever 48 to reverse the position of the valve 46 thereby reversing the pressure differential applied to the opposed motor chambers 40 and 42 so as to cause clockwise movement to the vane 38. Reversal of movement of the master motor vane will likewise cause reversal of the movement of the slave motor synchronizer vane and reverse the position of the valve 112 to effect movement reversal of the slave motor driver vane. To arrest operation of the wiper motor, the parking latch 84 is actuated so as to engage the annular groove 82 in the reversing valve 46 and maintain the reversing valve 46 in its right hand position. In this manner, hydraulic fluid will be supplied through ports 62 and 74 to the master motor chamber 42 through passage 86 and port 92 so as to move the master motor vane 38 clockwise beyond its normal stroke end to a position against its end wall whereat its movement will be arrested. Simultaneously, the synchronizer vane 96 and the drive vane 106 of the slave motor assembly will be moved in the counterclockwise direction beyond their normal stroke ends to positions against their end walls whereat movement will be arrested.

With reference to FIGURES 4 through 11, structurally the master motor assembly 24 comprises an end plate 170 and a cover 172 having a gasket 174 arranged therebetween to form a sealed housing having a high pressure port 176, a drain port 178 and left and right hand synchronizer ports 180 and 182. The end plates 170 includes a tubular extension 184 having a pair of spaced sleeve bearings 186 and 188 therein for rotatably journalling the pivot shaft 44. An O-ring seal 190 is arranged outboard of the sleeve bearing 186. In addition, the end plate 170 has a pair of mounting flanges 192 for attaching the master motor assembly to a suitable mounting bracket in the vehicle.

The master motor cylinder 36 is formed by an arcuate vane housing 194, the end plate 170 and a face plate 196 which are interconnected by a plurality of bolts 198. The vane piston 38 is disposed within the vane housing 194 and is drivingly connected to the pivot shaft 44 which extends therethrough. The master vane piston 38 is shown in its inboard stroke position in FIGURE 8, and the outboard and park positions are indicated in phantom.

As seen in FIGURES 8 and 10, the face plate 196 has tapered grooves constituting ports 90 and 92 on one side thereof connected by axially extending passages 91 and 93, respectively, to passages 86 and 88, respectively, on the opposite side of the face plate 196. As seen in FIGURE 9, a separator plate 197 is sandwiched between a pair of gaskets 200 and 202 between the face plate 196 and a valve plate 204. The valve plate 204 has a transverse bore 206 within which the reversing valve 46 is reciprocably supported. The passage 86 in the face plate 196 connects with the control port 74 of the valve bore 206 through a port 208 in the separator plate 197, and the passage 88 in the face plate 196 connects with the port 76 of the valve bore 206 through a passage 210 in the separator plate 197. The port 78 of the valve bore connects with the right hand synchronizer port 182 and the port 80 of the valve bore 206 connects with the left hand synchronizer port 80. The high pressure port 176, as seen in FIGURE 5, connects with the inlet port 52 of the manual control valve 50, and the outlet port 60 thereof connects with a groove 212 between the valve plate 204 and the gasket 202, the groove 212 being connected to ports 62 and 64 of the valve bore 206.

The valve plate 204 is formed with four internally threaded tubular bosses 214 having gaskets 216 interposed between their ends and the inner surface of the cover 172 and receiving screws 218 to interconnect the valve plate 204 and the cover 172. The separator plate 197, the gaskets 200 and 202, and the valve plate 204 are retained in position by four of the bolts 198. The drain port 178 is formed as a part of the cover 172 and connects the entire interior of the housing to drain. Thus, any hydraulic fluid which leaks from the master cylinder or the valve will be collected within the sealed housing and will flow back to the reservoir through the drain port 178.

With particular reference to FIGURES 4, 5 and 6, the inner end of the pivot shaft 44 which projects through the face plate 196 has a crank arm 220 drivingly connected thereto and retained in assembled relation therewith by a snap ring 222. The arm 220 has an axially projecting crank pin 224 that extends through one elongate slot 226 in one leg of a U-shaped lever 228. The lever 228 is pivotally supported on a pin 230 rigidly mounted in the valve plate 204. The valve actuating toggle lever 48 is connected to a pin 232 arranged between the legs of the U-shaped lever 228 and extending through the slots 226 in the legs thereof. A C-shaped toggle spring 234 has one end engaging the pin 232 and the other end engaging an abutment 236 on the lever 228. The toggle lever 48 operates in a conventional manner in that as soon as it is moved over-center by the driver 228, the spring 234 snaps the toggle lever 48 to the other limit position so as to automatically shift the reversing valve 46 adjacent the stroke ends of the vane piston 38 thereby maintaining the vane piston in a state of continuous oscillation.

The manual control valve 50, as seen in FIGURE 6, has an annular groove 51 receiving the end of an actuating lever 238 which, as seen in FIGURES 4 and 11, has an off-set position 240 arranged normal to the valve actuating end thereof which is drivingly connected to a control shaft 242 journalled in the cover 172. The actuating end of the lever 238 extends through a slot 244 in the valve plate 204, the ends of the slot constituting stops limiting movement of the lever 238, and hence the valve 50 in both directions. The shaft 242 is connected to a second lever 246 located externally of the cover 172 to which the end of a Bowden wire 248 is attached. The housing 250 for the Bowden wire 248 is suitably attached to the cover 172 as seen in FIGURE 3.

The control shaft 242 has a flat cam surface 252 thereon which is engaged by one end of the parking latch 84 under the urge of a torsion spring 254, one end of which engages the pin 230 and the other end of which engages the latch 84, the middle portion of the spring 254 being coiled about a pivot pin 256 which pivotally supports the latch 84. The pivot pin 256 is carried by the valve plate 204. The torsion spring 254 biases the latch 84 so that its other end is adapted to engage the groove 82 of the reversing valve 46, as seen in FIGURE 6. Thus, one end of the latch 84 is arranged in a slot 258 of the valve plate. In the "on" position of the manual control valve 50, the flat 252 on the shaft 242 holds the latch 84 in a position where it cannot engage groove 82 of the reversing valve 46. However, upon counterclockwise movement of the shaft 252, the torsion spring 254 pivots the latch 84 in the clockwise direction about the pin 256 thus enabling the end of the latch to engage the groove 82 in the reversing valve 46 and retain the reversing valve 46 in its right hand limit position as described.

With reference to FIGURES 12 through 16, structurally the slave motor assembly 22 comprises an end plate 260 and a cover 262, a gasket 264 being disposed therebetween to form a sealed housing. The housing of the slave motor assembly has a pressure supply port 266, a left hand synchronizer port 268 and a right hand synchronizer port 270, as well as a drain port 272. Likewise, the front plate 260 includes integral tubular extension 274 having spaced sleeve bearings 276 and 278 and journalling the pivot shaft 102. An O-ring seal 280 is arranged outboard of the sleeve bearing 276. The synchronizer vane piston 96 is mounted in a vane housing 282, the synchronizer cylinder being formed by the end plate 260, the housing 282 and a synchronizer face plate 284. The driver vane 106 is disposed within a vane housing 286, and the driver vane cylinder is formed by the synchronizer plate 284, the vane housing 286 and a face plate 288. A porting plate 290 is sandwiched between a pair of gaskets 292 and 294, and a valve plate 296 is mounted on the outside of the gasket 292. The valve plate 296, the porting plate 290 and the face plates 288 and 284, as well as the vane housings 286 and 282 are held in assembled relation with the end plate 260 by a plurality of bolts 298. The valve plate 296 has three tubular posts 300 which receive screws 302 for connecting the cover 262 thereto, a gasket 304 being interposed between the cover 262 and a valve plate.

As seen in FIGURE 14, the face plate 288 has grooves in one side thereof constituting passages 158, 160, 150 and 154. The passages 150 and 154 connect with axial passages 151 and 155, respectively, which extend through the vane housing 286 and the face plate 284 wherein they are connected to the tapered inlet ports 152 and 156, respectively, of the synchronizer cylinder, as shown schematically in FIGURE 2. The passage 158 connects with tapered port 162 of the driving cylinder, and the passage 160 connects with tapered port 160 of the driver cylinder.

The passages 158 and 160 also connect with control ports 130 and 132, respectively, of the reversing valve 112. The reversing valve 112 is mounted for reciprocable movement in a valve bore 306 of the valve plate 296, the inlet port 120 of which is connected to the pressure supply through port 266 as seen in FIGURE 16. The ports 268 and 270 connect with passages 146 and 148 of the reversing valve 112. The drain ports 134 and 136 of the reversing valve 112 are connected directly to the interior of the cover 262 which is connected to drain through the port 272 formed therein.

While the embodiment of the invention as herein disclosed constitutes a preferred form, it is to be understood that other forms might be adopted.

What is claimed is as follows:

1. Windshield wiper actuating mechanism for a pair of spaced wipers, including, a master motor connected to one of said wipers comprising a cylinder having a pressure differential actuated piston therein dividing its cylinder into opposed chambers, a slave motor assembly connected to the other wiper comprising a pair of cylinders having a synchronizer piston disposed in one cylinder and a driver piston disposed in the other cylinder and movable under pressure differential, said synchronizer and driver pistons dividing their respective synchronizer and driver cylinders into opposed chambers, reversing valve means actuated by the master motor piston for controlling the alternate application of pressure differential to its opposed cylinder chambers, a slave motor reversing valve controlling the alternate application of pressure differential to the opposed chambers of the driver cylinder, servo means for actuating said slave motor reversing valve, and conduit means interconnecting the opposed chambers of the master motor cylinder and the synchronizer cylinder through the servo means for actuating the slave motor reversing valve to effect synchronous operation of said master and slave motors under normal load conditions.

2. Windshield wiper actuating mechanism for a pair of spaced wipers, including, a master motor connected to one of said wipers comprising a cylinder having a pressure differential actuated piston therein dividing its cylinder into opposed chambers, a slave motor assembly connected to the other wiper comprising synchronizer and driver cylinders having synchronizer and driver pistons therein, said driver piston dividing its cylinder into opposed chambers and movable under pressure differential therebetween, conduit means interconnecting the chambers of the master motor cylinder and the synchronizer motor cylinder, reversing valve means actuated by the master motor piston for controlling the alternate application of pressure differential to its opposed chambers, and servo actuated reversing valve means for controlling the alternate application of pressure differential between the opposed chambers of the driver cylinder in response to drain pressure supplied through said conduit means from said master motor cylinder to said synchronizer motor cylinder for effecting synchronous operation of said master and slave motors.

3. Windshield wiper actuating mechanism for a pair of spaced wipers, including, a master hydraulic motor connected to one wiper, a slave hydraulic motor connected to the other wiper, each motor comprising a cylinder having a reciprocable piston therein and a reversing valve for subjecting opposite sides of its respective piston to differential pressures in alternate directions to reciprocate the same, and a synchronizer cylinder hydraulically connected to said master motor cylinder and having a reciprocable synchronizer piston therein interconnected with the slave piston and actuated by movement of the master piston for controlling the pressure differential on opposite sides of the slave piston so as to synchronize the operation of said master and slave motors.

4. Windshield wiper actuating mechanism for a pair of spaced wipers, including, a master hydraulic motor connected to one wiper, a slave hydraulic motor connected to the other wiper, each motor comprising a cylinder having a reciprocable piston therein, a pair of reversing valves for subjecting opposite sides of the master and slave pistons to differential pressures in alternate directions to reciprocate the same, a synchronizer cylinder hydraulically connected to said master motor cylinder and having a reciprocable synchronizer piston therein interconnected with the slave piston and actuated by movement of the master piston for controlling the pressure differential on opposite sides of the slave piston so as to synchronize the operation of said master and slave motors, and manually operable valve means for controlling the speed of operation of said master motor piston, and hence the speed of the slave motor piston and for parking said pistons beyond their running strokes.

5. Windshield wiper actuating mechanism for a pair of spaced wipers, including, a master hydraulic motor connected to one wiper, a slave hydraulic motor connected to the other wiper, each motor comprising a cylinder having a reciprocable piston therein, a reversing valve actuated by said master piston for subjecting opposite sides of said master piston to differential pressures in alternate directions to reciprocate the same, a servo operated reversing valve for subjecting opposite sides of the slave piston to differential pressures in opposite directions to reciprocate the same, and a synchronizer cylinder hydraulically connected with said master motor cylinder and said servo actuated reversing valve and having a reciprocable synchronizer piston therein interconnected with the slave piston and actuated by movement of the master piston for regulating the pressure differential on opposite sides of said slave piston so as to synchronize operation of said master and slave motors.

6. Windshield wiper actuating mechanism for a pair of spaced wipers, including, a master hydraulic motor connected to one wiper, a slave hydraulic motor connected to the other wiper, each motor comprising a cylinder having a reciprocable piston therein, a reversing valve for subjecting opposite sides of the master piston to differential pressures in alternate directions to reciprocate the same, snap acting mechanism actuated by said master piston adjacent its running stroke ends for effecting movement of said reversing valve between predetermined limit positions, a servo actuated reversing valve for subjecting opposite sides of the slave piston to differential pressures in alternate directions to reciprocate the same, a synchronizer cylinder having a reciprocable piston therein interconnected with the slave piston, and conduit means interconnecting the master cylinder and the slave cylinder through the servo actuated reversing valve whereby the synchronizer piston reciprocates in response to movement of the master piston and the hydraulic flow between the master cylinder and the synchronizer cylinder operates said servo actuated reversing valve to regulate the pressure differential on opposite sides of said slave piston so as to synchronize the operation of said master and slave motors.

7. The actuating mechanism set forth in claim 6 including a common housing for said slave cylinder and said synchronizer cylinder.

8. The actuating mechanism set forth in claim 7 wherein said servo actuated reversing valve is disposed within said housing and comprises a normally spring centered plunger.

9. The actuating mechanism set forth in claim 8 wherein said reversing valve plunger includes end lands constituting piston means, and wherein said piston means are disposed in servo chambers connected to the conduit means interconnecting the master cylinder and the synchronizer cylinder.

10. The actuating mechanism set forth in claim 6 wherein the snap acting mechanism for the reversing valve of the master motor includes a spring toggle, and wherein said master motor includes a manually operable throttle valve for regulating the pressure differential on opposite sides of the master piston to control the speed of operation thereof.

11. The actuating mechanism set forth in claim 10 including a latch engageable with the reversing valve of said master motor for preventing movement thereof in one direction by said spring toggle to thereby extend the movement of said master piston and said slave piston beyond their normal running stroke ends to parked positions.

12. A wiper motor including, a housing, a cylinder disposed within said housing, a piston reciprocable in said cylinder, a reversing valve disposed within said housing and mechanically operated by said piston at either end of its running stroke for subjecting opposite sides of said piston to differential pressures in alternate directions to reciprocate the same, a manual control valve in said housing for regulating pressure differential applied to opposite sides of said piston to control the speed of operation thereof, and a latch engageable with said reversing valve when the manual control valve is moved to a predetermined position for preventing movement of said reversing valve in one direction to extend the stroke of said piston beyond one end of its running stroke to a parked position.

13. A wiper motor including, a housing, an arcuate cylinder in said housing, an oscillatable vane piston disposed within said arcuate cylinder, a face plate constituting one wall of said cylinder and having ports therein connected with said cylinder on opposite sides of said vane piston, a valve plate disposed within said housing and connected with said face plate, a reversing valve carried by said valve plate and connected by passage means with the ports in said face plate for subjecting opposite sides of the piston to differential pressures in alternate directions to oscillate the same, a manual control valve for regulating the pressure differential applied to opposite sides of said main piston to control the speed of oscillation thereof, and a latch engageable with said reversing valve for preventing movement thereof in one direction to park said vane piston outside of its running stroke.

14. The wiper motor set forth in claim 13 including, a spring toggle interconnecting the vane piston and said reversing valve, said spring toggle including a lever engageable with a groove in said reversing valve, and wherein said latch is engageable with said groove for preventing movement of said reversing valve by said spring toggle in said one direction.

15. The wiper motor set forth in claim 14 wherein said latch is spring biased into engagement with said reversing valve, and wherein said motor includes a control shaft having a cam surface thereon engageable with said latch for withdrawing said latch from the groove in said reversing valve, and means interconnecting said control shaft and said manual control valve.

16. A slave wiper motor designed for synchronous operation with a master wiper motor including, a housing, a pair of cylinders within said housing, interconnected driver and synchronizer pistons disposed within said cylinders, a reversing valve disposed within said housing for subjecting opposite sides of the driver piston to differential pressures in alternate directions to reciprocate the same, servo means for actuating said reversing valve, and passage means connecting the servo means with said synchronizer cylinder whereby the pressure differential on opposite sides of the synchronizer piston regulates the pressure differential applied to opposite sides of said driver piston.

17. A slave wiper motor designed for synchronous operation with a master wiper motor including, a housing, a pair of arcuate cylinders in said housing, arcuate driver and synchronizer pistons disposed within said arcuate cylinders, a shaft rigidly interconnecting said driver and synchronizer pistons for oscillation in unison, a reversing valve in said housing for subjecting opposite sides of said driver piston to differential pressures in alternate directions to oscillate the same, a pair of oppositely acting springs for centering said reversing valve, oppositely acting servo means for moving said reversing valve in opposite directions from its centered position to control the alternate application of differential pressure to opposite sides of said driver piston, and passage means connecting said servo means with said synchronizer cylinder on opposite sides of said synchronizer piston whereby the direction of movement of said driver piston is determined by the pressure differential on opposite sides of said synchronizer piston, and wherein the pressure differential applied to opposite sides of said driver piston is regulated by the load imposed on said shaft interconnecting the driver and synchronizer pistons.

18. The wiper motor set forth in claim 17 wherein said reversing valve includes a valve plate having pressure and inlet ports, a pair of control ports and a pair of drain ports, and a plunger disposed in said housing having a plurality of spaced sealing lands, the end lands on said plunger constituting piston means responsive to fluid under pressure for moving said plunger to opposite sides of its centered position.

19. The wiper motor set forth in claim 18 wherein the said valve plate includes axially extending drain grooves communicating with said drain ports for connecting said servo chambers to drain when said slave motor is subjected to an overload which prevents movement of the shaft interconnecting the synchronizer and driver pistons.

References Cited in the file of this patent

UNITED STATES PATENTS

| | | |
|---|---|---|
| 2,164,876 | Horlacher | July 4, 1939 |
| 2,547,175 | Sacchini | Apr. 3, 1951 |
| 2,674,233 | Sprague et al. | Apr. 6, 1954 |
| 2,683,353 | O'Shei | July 13, 1954 |
| 2,698,608 | Milner et al. | Jan. 4, 1955 |
| 2,708,911 | Oishei | May 24, 1955 |